(12) United States Patent
Toby et al.

(10) Patent No.: US 9,992,860 B2
(45) Date of Patent: Jun. 5, 2018

(54) PRINTED CIRCUIT BOARD CAPACITOR STRUCTURES

(71) Applicant: HEWLETT PACKARD ENTERPRISE DEVELOPMENT LP, Houston, TX (US)

(72) Inventors: Benjamin Toby, Fort Collins, CO (US); Karl J. Bois, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days. days.

(21) Appl. No.: 15/138,870

(22) Filed: Apr. 26, 2016

(65) Prior Publication Data

US 2017/0311434 A1    Oct. 26, 2017

(51) Int. Cl.
| | |
|---|---|
| H02M 3/06 | (2006.01) |
| H05K 1/02 | (2006.01) |
| H05K 1/18 | (2006.01) |
| H05K 1/11 | (2006.01) |
| G06F 17/50 | (2006.01) |
| H05K 3/00 | (2006.01) |
| H03H 7/00 | (2006.01) |
| H01P 3/08 | (2006.01) |
| H02M 3/22 | (2006.01) |

(52) U.S. Cl.
CPC ......... *H05K 1/025* (2013.01); *G06F 17/5068* (2013.01); *H01P 3/081* (2013.01); *H03H 7/004* (2013.01); *H05K 1/111* (2013.01); *H05K 1/181* (2013.01); *H05K 3/0005* (2013.01); *H05K 2201/10015* (2013.01)

(58) Field of Classification Search
CPC ...... H01P 3/081; H05K 1/025; H05K 1/0231; H05K 1/111; H05K 1/181; H05K 2201/10015; H02M 3/06; H02M 3/22
USPC ....... 333/246; 361/306.1, 306.2, 308.1, 328; 307/109
See application file for complete search history.

(56) References Cited

U.S. PATENT DOCUMENTS

| | | | |
|---|---|---|---|
| 6,211,754 B1 * | 4/2001 | Nishida | H03B 5/1852 331/107 SL |
| 6,661,316 B2 | 12/2003 | Hreish et al. | |
| 6,898,070 B2 * | 5/2005 | Korony | H01G 4/232 333/184 |
| 6,995,632 B2 * | 2/2006 | Saito | H01P 1/215 333/175 |
| 7,385,459 B2 * | 6/2008 | Duan | H01P 1/203 333/246 |

(Continued)

OTHER PUBLICATIONS

Reference Designer, 2D Field Solver for Calculating Capacitance, http://referencedesigner.com/books/si/field-solver-capacitance.php, Jul. 4, 2016, 2 pgs.

*Primary Examiner* — Dean Takaoka (74) *Attorney, Agent, or Firm* — Dicke, Billig & Czaja, PLLC (57) ABSTRACT

One example includes a printed circuit board (PCB) structure. The PCB structure includes a first dereferenced microstrip and a first capacitor pad contacting the first dereferenced microstrip. The PCB structure includes a second dereferenced microstrip and a second capacitor pad contacting the second dereferenced microstrip. The PCB structure also includes a capacitor including a first terminal contacting the first capacitor pad and a second terminal contacting the second capacitor pad.

9 Claims, 4 Drawing Sheets (56) References Cited

U.S. PATENT DOCUMENTS

| | | |
|---|---|---|
| 7,566,952 B2 | 7/2009 | Floyd et al. |
| 7,757,196 B2 | 7/2010 | Bird et al. |
| 8,119,921 B1 | 2/2012 | Goergen et al. |
| 8,263,877 B2 * | 9/2012 | Liu .................. H05K 1/162 |
| | | 174/261 |
| 8,604,891 B2 * | 12/2013 | Ohhira ................ H01P 5/028 |
| | | 333/24 C |
| 9,185,794 B1 * | 11/2015 | Reynov ................ H05K 3/30 |
| 2006/0286691 A1 | 12/2006 | Goren et al. |

* cited by examiner

PRINTED CIRCUIT BOARD CAPACITOR STRUCTURES

BACKGROUND

A printed circuit board (PCB) may include serial communication channels to transfer data between components. The serial communication channels may include single-ended transmission lines or differential transmission lines. Serial communication channels of a PCB may include signal traces, vias, coupling capacitors, and/or other passive structures for transmitting signals through the PCB.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Passive printed circuit board (PCB) structures, such as alternating current (AC) coupling capacitors, may be used as components of a serial communication channel. A coupling capacitor may become a non-arbitrary discontinuity on a transmission line at high frequency bit bates when simply placed on a PCB. Therefore, in an attempt to compensate for this discontinuity, PCBs may include an antipad directly below the capacitor. This antipad structure, however, is typically not simulated or optimized, and may therefore not work as desired at high frequencies.

Accordingly, AC coupling capacitor structures and a process that allows for intelligently and deliberately designing the AC coupling capacitor structures are described herein. This is accomplished by dividing the analysis of the AC coupling capacitor structure into electrically smaller elements and modifying at least one parameter of each element using electromagnetic simulation (e.g., quasi-static three-dimensional (3D) or two-dimensional (2D) simulation) or another suitable method to produce an image impedance at the input and the output of the AC coupling capacitor structure that is equal to the desired characteristic impedance.

Figure 1A:
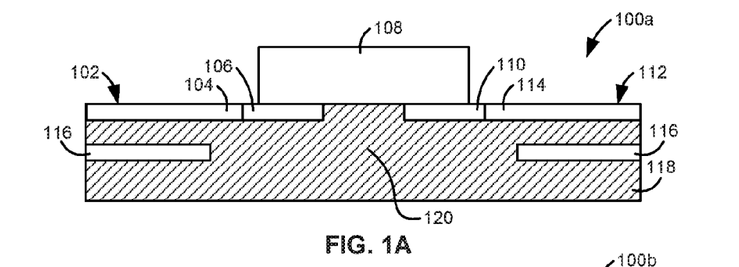
FIG. 1A illustrates a cross-sectional view of one example of an alternating current (AC) coupling capacitor structure.

FIG. 1A illustrates a cross-sectional view of one example of an AC coupling capacitor structure 100a. AC coupling capacitor structure 100a may be a component of a serial communication channel of a PCB. AC coupling capacitor structure 100a includes a first signal trace 102 including a first dereferenced microstrip 104, a first capacitor pad 106, a capacitor 108, a second capacitor pad 110, a second signal trace 112 including a second dereferenced microstrip 114, a common or ground layer 116 defining an antipad 120, and a dielectric material 118. In one example, capacitor 108 is a surface mount capacitor. First dereferenced microstrip 104 is the portion of signal trace 102 that does not overlap common or ground layer 116, which provides a common or ground for the signal transmitted through AC coupling capacitor structure 100a. Likewise, second dereferenced microstrip 114 is the portion of signal trace 112 that does not overlap common or ground layer 116.

First dereferenced microstrip 104 contacts first capacitor pad 106. Second dereferenced microstrip 114 contacts second capacitor pad 110. A first terminal of capacitor 108 contacts the upper surface of first capacitor pad 106, and a second terminal of capacitor 108 contacts the upper surface of second capacitor pad 110. Accordingly, a signal may be transmitted from signal trace 102 to signal trace 112 or from signal trace 112 to signal trace 102. Antipad 120 extends below first dereferenced microstrip 104, first capacitor pad 106, capacitor 108, second capacitor pad 110, and second dereferenced microstrip 114. Common or ground layer 116 extends under the remaining portions of signal trace 102 and signal trace 112 and surrounds antipad 120.

The length of first dereferenced microstrip 104 and the length of second dereferenced microstrip 114 in the direction parallel to the signal flow through AC coupling capacitor structure 100a are set by setting the length of antipad 120. The length of first dereferenced microstrip 104 and the length of second dereferenced microstrip 114 are set such that an image impedance of the input and the output (e.g., at the interface between the portion of signal trace 102 overlapping common or ground layer 116 and first dereferenced microstrip 104 and at the interface between the portion of signal trace 112 overlapping common or ground layer 116 and second dereferenced microstrip 114) of AC coupling capacitor structure 100a equals a target impedance. In one example, the target impedance equals a characteristic impedance of a feeding transmission line coupled to AC coupling capacitor structure 100a.

Figure 1B:
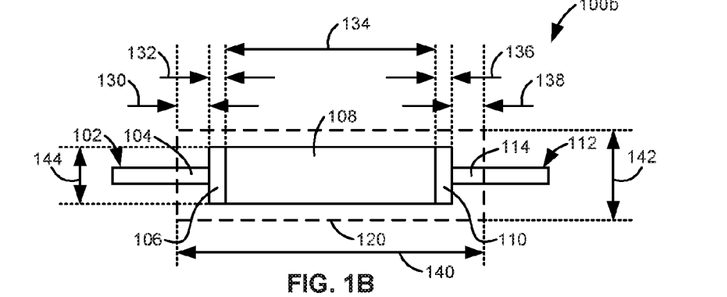
FIG. 1B illustrates a top view of one example of an AC coupling capacitor structure.

FIG. 1B illustrates a top view of one example of an AC coupling capacitor structure 100b. In one example, AC coupling capacitor structure 100b is similar to AC coupling capacitor structure 100a previously described and illustrated with reference to FIG. 1A. AC coupling capacitor structure 100b includes a first dereferenced microstrip 104, a first capacitor pad 106, a capacitor 108, a second capacitor pad 110, a second dereferenced microstrip 114, and an antipad 120.

The length of first dereferenced microstrip 104 is indicated at 130. The length of the portion of first capacitor pad 106 that does not overlap capacitor 108 is indicated at 132. The length of capacitor 108 is indicated at 134, and the width of capacitor 108 is indicated at 144. The length of the portion of second capacitor pad 110 that does not overlap capacitor 108 is indicated at 136. The length of second dereferenced microstrip 114 is indicated at 138. The length of antipad 120 is indicated at 140, and the width of antipad 120 is indicated at 142.

In this example, as illustrated in FIG. 1B, the width 142 of antipad 120 is greater than the width 144 of capacitor 108 such that both sides of capacitor 108 parallel to the signal flow through AC coupling capacitor structure 100b are spaced apart from the sides of antipad 120. The length 140 of antipad 120 defines the length 130 of first dereferenced microstrip 104 and the length 138 of second dereferenced microstrip 114. In one example, the length 130 of first dereferenced microstrip 104 and the length 138 of second dereferenced microstrip 114 are equal. In other examples, the length 130 of first dereferenced microstrip 104 and the length 138 of second referenced microstrip 114 may be different. In one example, the length 132 of first capacitor pad 106 and the length 136 of second capacitor pad 110 are equal. In other examples, the length 132 of first capacitor pad 106 and the length 136 of second capacitor pad 110 may be different depending on the placement of capacitor 108.

Figure 1C:
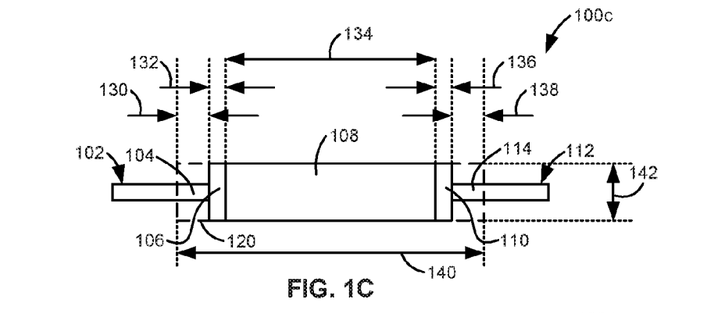
FIG. 1C illustrates a top view of another example of an AC coupling capacitor structure.

FIG. 1C illustrates a top view of another example of an AC coupling capacitor structure 100c. AC coupling capacitor structure 100c is similar to AC coupling capacitor structure 100b previously described and illustrated with reference to FIG. 1B, except that for AC coupling capacitor structure 100c the width 142 of antipad 120 equals the width of capacitor 108. By setting the width of antipad 120 equal to the width of capacitor 108, a PCB may have a greater routing density than a PCB where the width 142 of antipad 120 is greater than the width of capacitor 108 as illustrated in FIG. 1B. A PCB having the width 142 of antipad 120 greater than the width of capacitor 108, however, may have an increased operational bandwidth than a PCB where the width 142 of antipad 120 equals the width of capacitor 108.

Figure 1D:
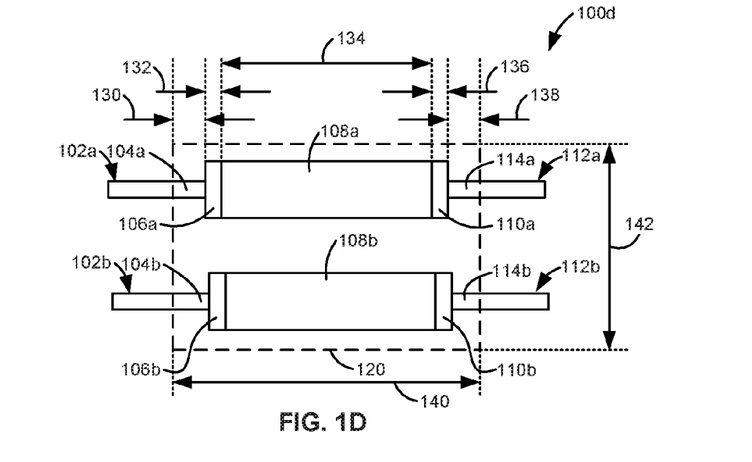
FIG. 1D illustrates a top view of one example of a differential AC coupling capacitor structure.

FIG. 1D illustrates a top view of one example of a differential AC coupling capacitor structure 100d. Differential AC coupling capacitor structure 100d includes two parallel AC coupling capacitor structures sharing a single antipad 120. Differential AC coupling capacitor structure 100d includes a first AC coupling capacitor structure including a first dereferenced microstrip 104a, a first capacitor pad 106a, a capacitor 108a, a second capacitor pad 110a, and a second dereferenced microstrip 114a. Differential AC coupling capacitor structure 100d also includes a second AC coupling capacitor structure including a first dereferenced microstrip 104b, a first capacitor pad 106b, a capacitor 108b, a second capacitor pad 110b, and a second dereferenced microstrip 114b.

First dereferenced microstrip 104a of the first AC coupling capacitor structure and first dereferenced microstrip 104b of the second AC coupling capacitor structure are the portions of signal traces 102a and 102b, respectively, which do not overlap the common or ground layer (e.g., layer 116 of FIG. 1A) surrounding antipad 120. Likewise, second dereferenced microstrip 114a of the first AC coupling capacitor structure and second dereferenced microstrip 114b of the second AC coupling capacitor structure are the portions of signal traces 112a and 112b, respectively, which do not overlap the common or ground layer surrounding antipad 120.

In this example, as illustrated in FIG. 1D, the width 142 of antipad 120 is greater than the distance between the outer sides of capacitors 108a and 108b such that the outer sides of capacitors 108a and 108b are each spaced apart from the sides of antipad 120. In other examples, the width 142 of antipad 120 may equal the distance between the outer sides of capacitors 108a and 108b such that the outer sides of capacitors 108a and 108b are aligned with the sides of antipad 120.

The length of first dereferenced microstrips 104a and 104b is indicated at 130. The length of the portions of first capacitor pads 106a and 106b that do not overlap capacitors 108a and 108b, respectively, is indicated at 132. The length of capacitors 108a and 108b is indicated at 134. The length of the portions of second capacitor pads 110a and 110b that do not overlap capacitors 108a and 108b, respectively, is indicated at 136. The length of second dereferenced microstrips 114a and 114b is indicated at 138. The length of antipad 120 is indicated at 140, and the width of antipad 120 is indicated at 142.

The length 130 of first dereferenced microstrips 104a and 104b and the length 138 of second dereferenced microstrips 114a and 114b are set by setting the length 140 of antipad 120. The length 130 of first dereferenced microstrips 104a and 104b and the length 138 of second dereferenced microstrips 114a and 114b are set such that an image impedance of the input and the output of differential AC coupling capacitor structure 100d equals a target impedance. In one example, the target impedance equals a differential impedance of a differential feeding transmission line coupled to differential AC coupling capacitor structure 100d.

Figure 2:
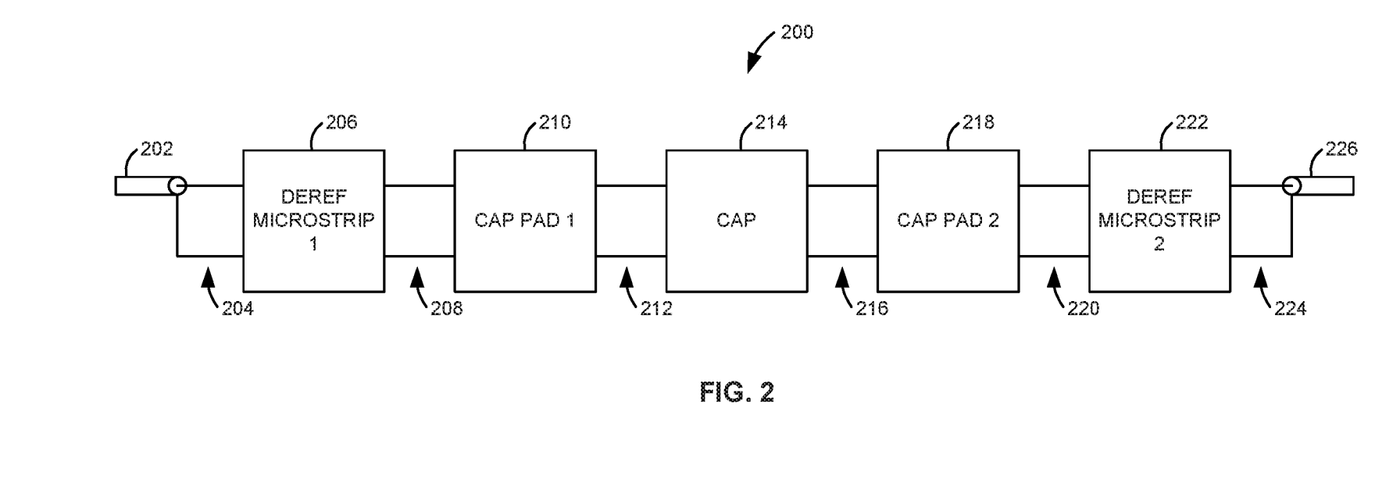
FIG. 2 is a block diagram illustrating one example of a model of the AC coupling capacitor structure illustrated in FIG. 1A.

FIG. 2 is a block diagram illustrating one example of a model 200 of the AC coupling capacitor structure illustrated in FIG. 1A. In this example, the AC coupling capacitor structure has been divided into five elements for optimizing (e.g., tuning) the AC coupling capacitor structure. In other examples, however, the AC coupling capacitor structure may be divided into another suitable number of elements for optimizing the AC coupling capacitor structure. Model 200 includes a first feeding transmission line 202, a first dereferenced microstrip 206, a first capacitor pad 210, a capacitor 214, a second capacitor pad 218, a second dereferenced microstrip 222, and a second feeding transmission line 226.

First feeding transmission line 202 is electrically coupled to the input of first dereferenced microstrip 206 through a signal path 204. The output of first dereferenced microstrip 206 is electrically coupled to the input of first capacitor pad 210 through a signal path 208. The output of first capacitor pad 210 is electrically coupled to the input of capacitor 214 through a signal path 212. The output of capacitor 214 is electrically coupled to the input of second capacitor pad 218 through a signal path 216. The output of second capacitor pad 218 is electrically coupled to the input of second dereferenced microstrip 222 through a signal path 220. The output of second dereferenced microstrip 222 is electrically coupled to second feeding transmission line 226 through a signal path 224. In other examples, the input and the output of each element 206, 210, 214, 218, and 222 may be reversed.

In one example, each element 206, 210, 214, 218, and 222 may be modeled as an inductor-capacitor-inductor (LCL) T network. The LCL T network model provides a highly accurate approximation since each element 206, 210, 214, 218, and 222 is electrically small. Elements 206, 210, 214, 218, and 222 are concatenated together such that an image impedance at the input and the output of the AC coupling capacitor structure equals a target impedance.

The impedance of first feeding transmission line 202 and second feeding transmission line 226 may be set as the target impedance for the AC coupling capacitor structure. For example, for a first feeding transmission line 202 and a second feeding transmission line 226 having an impedance of 85 ohms, the AC coupling capacitor structure is optimized such that the image impedance of the input and the output of the AC coupling capacitor structure is equal to approximately 85 ohms. Each element 206, 210, 214, 218, and 222 may be individually optimized by determining at least one parameter of each element 206, 210, 214, 218, and 222 using electromagnetic simulation (e.g., 3D or 2D simulation) or another suitable process such that an image impedance of the input and the output of the AC coupling capacitor structure as a whole equals the target impedance.

The at least one parameter of each element 206, 210, 214, 218, and 222 may include any parameter that modifies the image impedance of the input and the output of the AC coupling capacitor structure. For example, the length of first dereferenced microstrip 206 and the length of second dereferenced microstrip 222 may be adjusted until the image impedance of the input and the output of the AC coupling capacitor structure equals the target impedance when concatenated with the individual image impedances of elements 210, 214, and 218. In another example, the length and/or the width of first capacitor pad 210 and the length and/or the width of second capacitor pad 218 may be adjusted until the image impedance of the input and the output of the AC coupling capacitor structure equals the target impedance when concatenated with the individual image impedances of elements 206, 214, and 222. Likewise, the capacitance of capacitor 214 may be adjusted until the image impedance of the input and the output of the AC coupling capacitor structure equals the target impedance when concatenated with the individual image impedances of elements 206, 210, 218, and 222.

Figure 3:
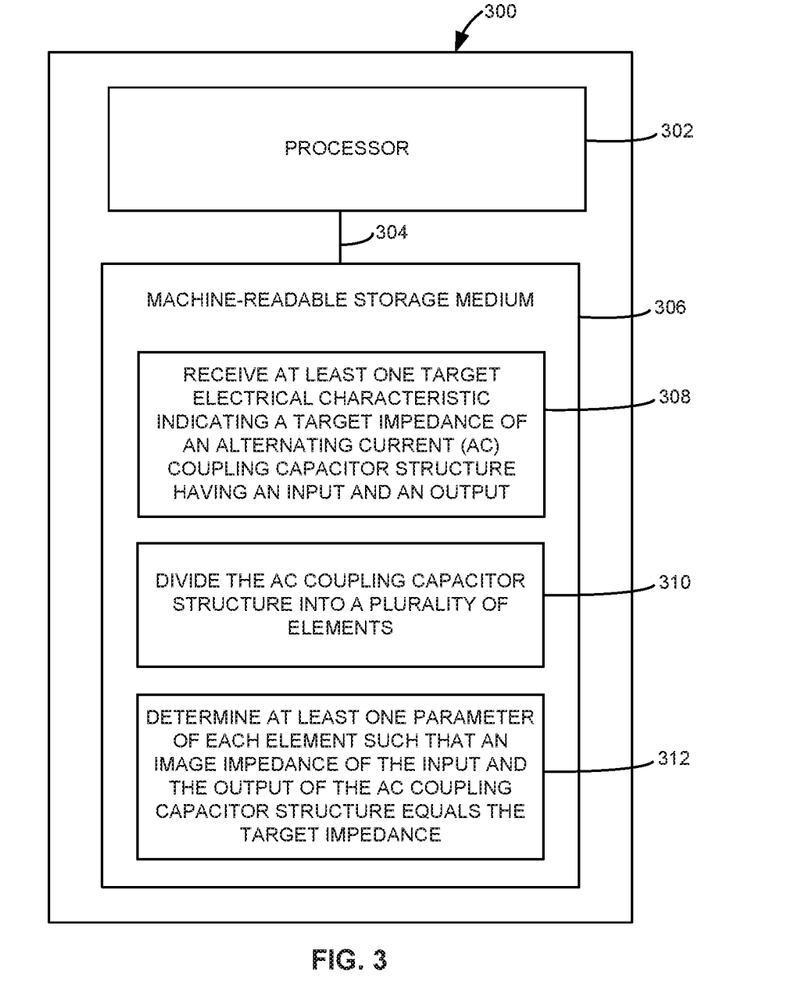
FIG. 3 is a block diagram illustrating one example of a processing system for determining parameters of AC coupling capacitor structures.

FIG. 3 is a block diagram illustrating one example of a processing system 300. System 300 includes a processor 302 and a machine-readable storage medium 306. Processor 302 is communicatively coupled to machine-readable storage medium 306 through a communication path 304. Although the following description refers to a single processor and a single machine-readable storage medium, the description may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 302 includes one or more central processing units (CPUs), microprocessors, and/or other suitable hardware devices for retrieval and execution of instructions stored in machine-readable storage medium 306. Processor 302 may fetch, decode, and execute instructions 308 to receive at least one target electrical characteristic indicating a target impedance of an AC coupling capacitor structure having an input and an output. The target electrical characteristic may include a reflection coefficient and/or a return loss value and/or another suitable characteristic that indicates a target impedance of the AC coupling capacitor structure to achieve the target electrical characteristic. For a single-ended serial communication channel, the target impedance may be the characteristic impedance ($Z_O$) of the serial communication channel. For a differential serial communication channel, the target impedance may be the differential impedance ($Z_{diff}$) of the serial communication channel.

Processor 302 may fetch, decode, and execute instructions 310 to divide the AC coupling capacitor structure into a plurality of elements. The AC coupling capacitor structure is intelligently broken into adjacent electrically small elements such that each element is suitable for analysis by computationally efficient electromagnetic simulation (e.g., 3D or 2D simulation) or other suitable optimization method. In one example, processor 302 may execute instructions to divide the AC coupling capacitor structure into a first dereferenced microstrip element, a first capacitor pad element contacting the first dereferenced microstrip element, a capacitor element contacting the first capacitor pad element, a second capacitor pad element contacting the capacitor element, and a second dereferenced microstrip element contacting the second capacitor pad element.

Processor 302 may fetch, decode, and execute instructions 312 to determine at least one parameter of each element such that an image impedance of the input and the output of the AC coupling capacitor structure equals the target impedance. In one example, processor 302 may execute instructions to determine the at least one parameter of each element through electromagnetic simulation (e.g., 3D or 2D simulation). The at least one parameter of each element may include a dimension (e.g., length, width, thickness) of the element itself and/or a spacing between the element and another element that defines a parasitic capacitance and/or a parasitic inductance of the element.

Processor 302 may execute instructions to determine a length of the first dereferenced microstrip element and a length of the second dereferenced microstrip element such that the image impedance of the input and the output of the AC coupling capacitor structure equals the target impedance. Processor 302 may further execute instructions to determine a size of an antipad below the AC coupling capacitor structure such that the image impedance of the input and the output of the AC coupling capacitor structure equals the target impedance. Processor 302 may further execute instructions to receive the at least one target electrical characteristic indicating the target impedance over an operational bandwidth and further execute instructions to determine the at least one parameter of each element such that the image impedance of the input and the output the AC coupling capacitor structure equals the target impedance over the operational bandwidth.

As an alternative or in addition to retrieving and executing instructions, processor 302 may include one or more electronic circuits comprising a number of electronic components for performing the functionality of one or more of the instructions in machine-readable storage medium 306. With respect to the executable instruction representations (e.g., boxes) described and illustrated herein, it should be understood that part or all of the executable instructions and/or electronic circuits included within one box may, in alternate examples, be included in a different box illustrated in the figures or in a different box not shown.

Machine-readable storage medium 306 is a non-transitory storage medium and may be any suitable electronic, magnetic, optical, or other physical storage device that stores executable instructions. Thus, machine-readable storage medium 306 may be, for example, random access memory (RAM), an electrically-erasable programmable read-only memory (EEPROM), a storage drive, an optical disc, and the like. Machine-readable storage medium 306 may be disposed within system 300, as illustrated in FIG. 3. In this case, the executable instructions may be installed on system 300. Alternatively, machine-readable storage medium 306 may be a portable, external, or remote storage medium that allows system 300 to download the instructions from the portable/external/remote storage medium. In this case, the executable instructions may be part of an installation package.

Figure 4:
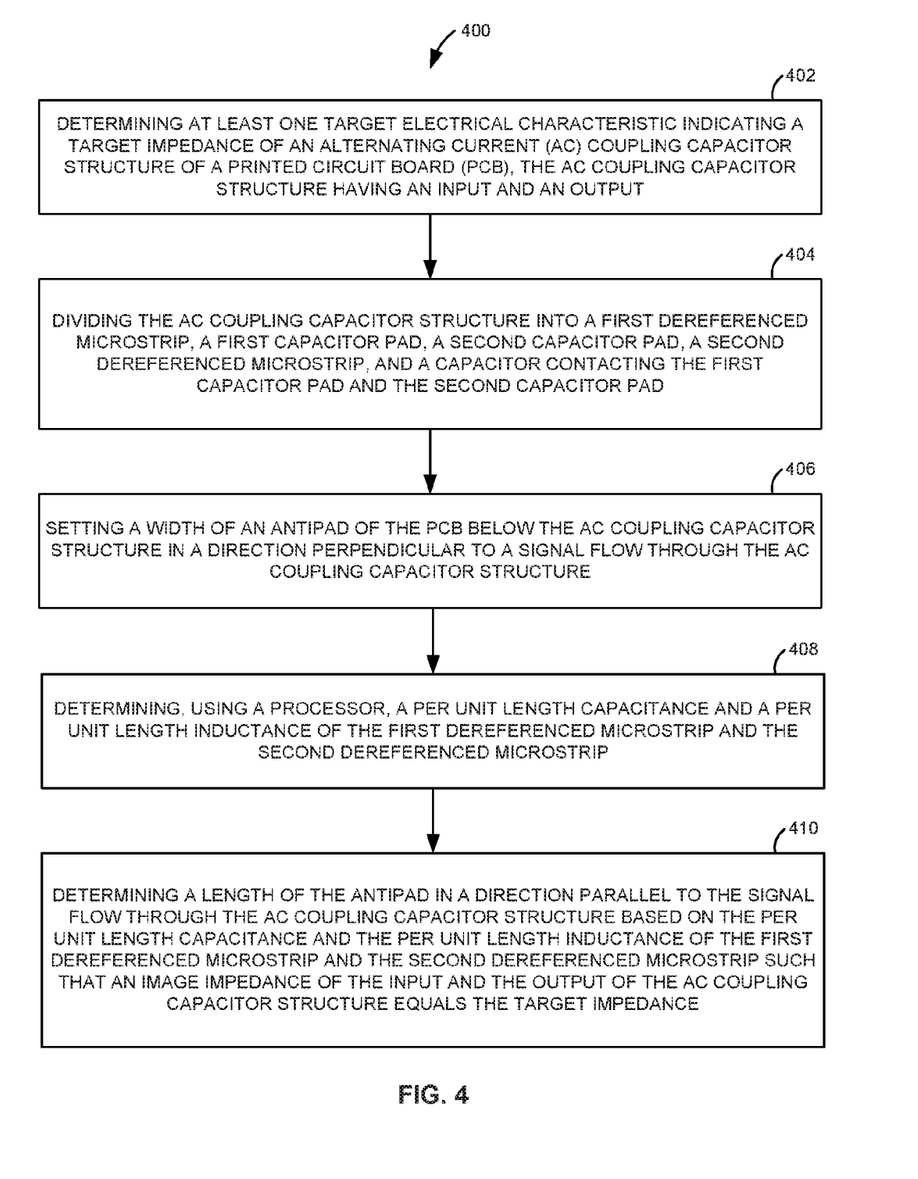
FIG. 4 is a flow diagram illustrating one example of a method for determining a length of an antipad of an AC coupling capacitor structure.

FIG. 4 is a flow diagram illustrating one example of a method 400 for determining a length of an antipad of an AC coupling capacitor structure. The AC coupling capacitor structure may be a component of a single-ended serial communication channel or a component of a differential serial communication channel. At 402, method 400 includes determining at least one target electrical characteristic indicating a target impedance of an AC coupling capacitor structure of a PCB, the AC coupling capacitor structure having an input and an output. At 404, method 400 includes dividing the AC coupling capacitor structure into a first dereferenced microstrip, a first capacitor pad, a second capacitor pad, a second dereferenced microstrip, and a capacitor contacting the first capacitor pad and the second capacitor pad.

At 406, method 400 includes setting a width of an antipad of the PCB below the AC coupling capacitor structure in a direction perpendicular to a signal flow through the AC coupling capacitor structure. In one example, the width of the antipad may be set equal to the width of the capacitor to allow for a greater routing density. In another example, the width of the antipad may be extended beyond the width of the capacitor, in which case a set of possible solutions may be determined. Of the set of possible solutions, the solution that is most geometrically preferable may be selected. Expanding the width of the antipad beyond the width of the capacitor may be desirable to increase the operational bandwidth of the AC coupling capacitor structure if geometric constraints allow.

At 408, method 400 includes determining, using a processor, a per unit length capacitance and a per unit length inductance of the first dereferenced microstrip and the second dereferenced microstrip. Method 400 may also include determining a per unit length capacitance and a per unit length inductance of the first capacitor pad, the second capacitor pad, and the capacitor. The per unit length capacitance and the per unit length inductance of each element may be determined using electromagnetic simulation (e.g., 3D or 2D simulation). The per unit length capacitance and the per unit length inductance of each element may be determined in a similar way for either single-ended or differential AC coupling capacitor structures. For the differential case, the differential capacitance and inductance values are used.

At 410, method 400 includes determining a length of the antipad in a direction parallel to the signal flow through the AC coupling capacitor structure based on the per unit length capacitance and the per unit length inductance of the first dereferenced microstrip and the second dereferenced microstrip such that an image impedance of the input and the output of the AC coupling capacitor structure equals the target impedance. In one example, the length ($l_{dereferenced}$) of the first dereferenced microstrip and the second dereferenced microstrip may be determined by using the following formula and solving for $l_{dereferenced}$:

$$Zi1 = Zi2 \approx \sqrt{\frac{L_{cap} + 2L_{pad} + 2l_{dereferenced}L'_{dereferenced}}{C_{cap} + 2C_{pad} + 2l_{dereferenced}C'_{dereferenced}}} = Z_0$$

where:
Zi1 is the image impedance at the input of the AC coupling capacitor structure;
Zi2 is the image impedance at the output of the AC coupling capacitor structure;
$Z_0$ is the characteristic impedance of the serial communication channel (e.g., the target impedance);
$L'_{dereferenced}$ is the per unit length inductance of the each of the first and second dereferenced microstrips;

$C'_{dereferenced}$ is the per unit length capacitance of the each of the first and second dereferenced microstrips;
$L_{cap}$ is the inductance of the capacitor;
$C_{cap}$ is the cross-sectional capacitance of the capacitor;
$L_{pad}$ is the inductance of each of the first and second capacitor pads; and
$C_{pad}$ is the capacitance of each of the first and second capacitor pads.

The above equation may be approximated when the elements are disparate enough from each other such that the inductance provided by the dereferenced microstrips and the capacitance provided by the capacitor and the capacitor pads dominate. In such a case, the above equation may be approximated as follows:

$$Zi1 = Zi2 \approx \sqrt{\frac{2l_{dereferenced}L'_{dereferenced}}{C_{cap} + 2C_{pad}}} = Z_o$$

The length of the antipad is then set such that the length of the first dereferenced microstrip and the length of the second dereferenced microstrip are equal to the length ($l_{dereferenced}$) calculated using the above equations.

In one example, after determining the length of the antipad, method 400 also includes analyzing the AC coupling capacitor structure using full-wave analysis to identify non transverse electromagnetic (TEM) effects and modifying at least one parameter of the AC coupling capacitor structure based on the results of the analysis to compensate for the non TEM effects. In one example, a non TEM effect may be due to the impedance created by the layer transition some of the return current of the AC coupling capacitor structure may experience. An AC coupling capacitor structure highly coupled to the topmost reference layer of the PCB, however, should experience a minimal effect due to the proportionally small amount of return current that may be present on a lower reference layer. This is likely for most cases, as the antipad may generally be kept small to reduce the geometric footprint. The impact of this inductance and any miscellaneous non TEM effects may be examined using full-wave simulation. To accurately assess the impact of the layer transition impedance, the nearest return vias should also be included in the analysis.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A machine-readable storage medium encoded with instructions, the instructions executable by a processor of a system to cause the system to:
receive at least one target electrical characteristic indicating a target impedance of an alternating current (AC) coupling capacitor structure having an input and an output;
divide the AC coupling capacitor structure into a plurality of elements; and
determine at least one parameter of each element such that an image impedance of the input and the output of the AC coupling capacitor structure equals the target impedance, after determining the at least one parameter of each element, analyzing the AC coupling capacitor structure using full-wave analysis to identify non transverse electromagnetic (TEM) effects; and modifying at least one parameter of the AC coupling capacitor structure based on the results of the analysis to compensate for the non TEM effects.

2. The machine-readable storage medium of claim 1, wherein the instructions are executable by the processor to further cause the system to:

divide the AC coupling capacitor structure into a first dereferenced microstrip element, a first capacitor pad element contacting the first dereferenced microstrip element, a capacitor element contacting the first capacitor pad element, a second capacitor pad element contacting the capacitor element, and a second dereferenced microstrip element contacting the second capacitor pad element.

3. The machine-readable storage medium of claim 2, wherein the instructions are executable by the processor to further cause the system to:

determine a length of the first dereferenced microstrip element and a length of the second dereferenced microstrip element such that the image impedance of the input and the output of the AC coupling capacitor structure equals the target impedance.

4. The machine-readable storage medium of claim 1, wherein the instructions are executable by the processor to further cause the system to:

determine a size of an antipad below the AC coupling capacitor structure such that the image impedance of the input and the output of the AC coupling capacitor structure equals the target impedance.

5. The machine-readable storage medium of claim 1, wherein the instructions are executable by the processor to further cause the system to:

determine the at least one parameter of each element through electromagnetic simulation.

6. The machine-readable storage medium of claim 1, wherein the instructions are executable by the processor to further cause the system to:

receive the at least one target electrical characteristic indicating the target impedance over an operational bandwidth; and determine the at least one parameter of each element such that the image impedance of the input and the output of the AC coupling capacitor structure equals the target impedance over the operational bandwidth.

7. A method comprising:

determining at least one target electrical characteristic indicating a target impedance of an alternating current (AC) coupling capacitor structure of a printed circuit board (PCB), the AC coupling capacitor structure having an input and an output;

dividing the AC coupling capacitor structure into a first dereferenced microstrip, a first capacitor pad, a second capacitor pad, a second dereferenced microstrip, and a capacitor contacting the first capacitor pad and the second capacitor pad;

setting a width of an antipad of the PCB below the AC coupling capacitor structure in a direction perpendicular to a signal flow through the AC coupling capacitor structure;

determining, using a processor, a per unit length capacitance and a per unit length inductance of the first dereferenced microstrip and the second dereferenced microstrip; and determining a length of the antipad in a direction parallel to the signal flow through the AC coupling capacitor structure based on the per unit length capacitance and the per unit length inductance of the first dereferenced microstrip and the second dereferenced microstrip such that an image impedance of the input and the output of the AC coupling capacitor structure equals the target impedance;

after determining the length of the antipad, analyzing the AC coupling capacitor structure using full-wave analysis to identify non transverse electromagnetic (TEM) effects; and modifying at least one parameter of the AC coupling capacitor structure based on the results of the analysis to compensate for the non TEM effects.

8. The method of claim 7, wherein the AC coupling capacitor structure is a component of a single-ended serial communication channel.

9. The method of claim 7, wherein the AC coupling capacitor structure is a component of a differential serial communication channel.

* * * * *